United States Patent Office 2,833,591
Patented May 6, 1958

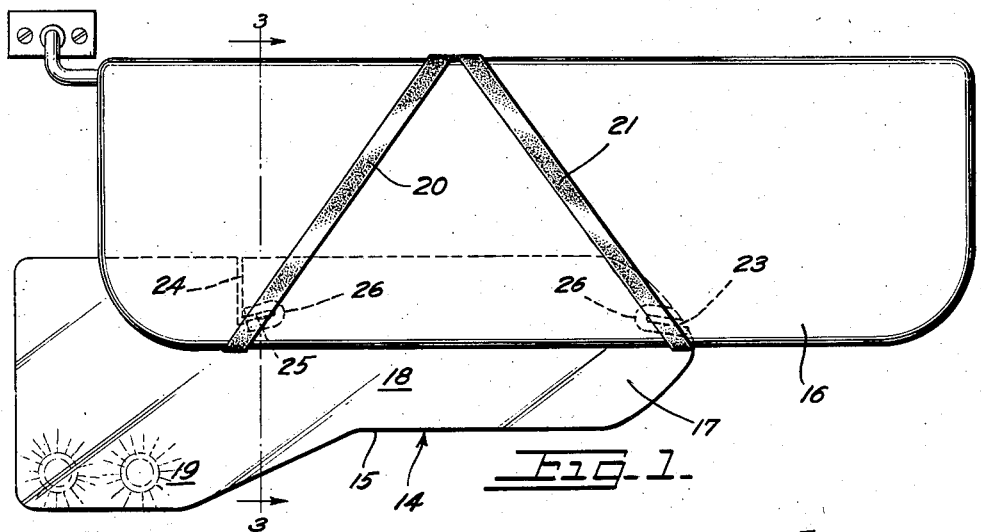
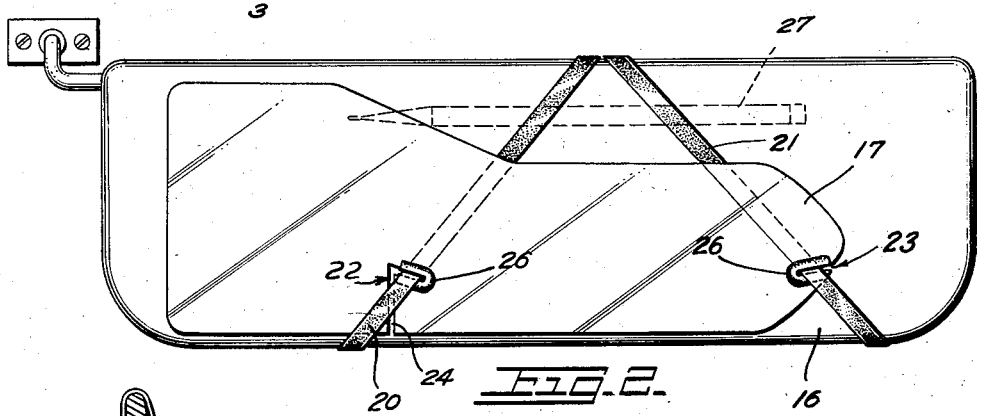
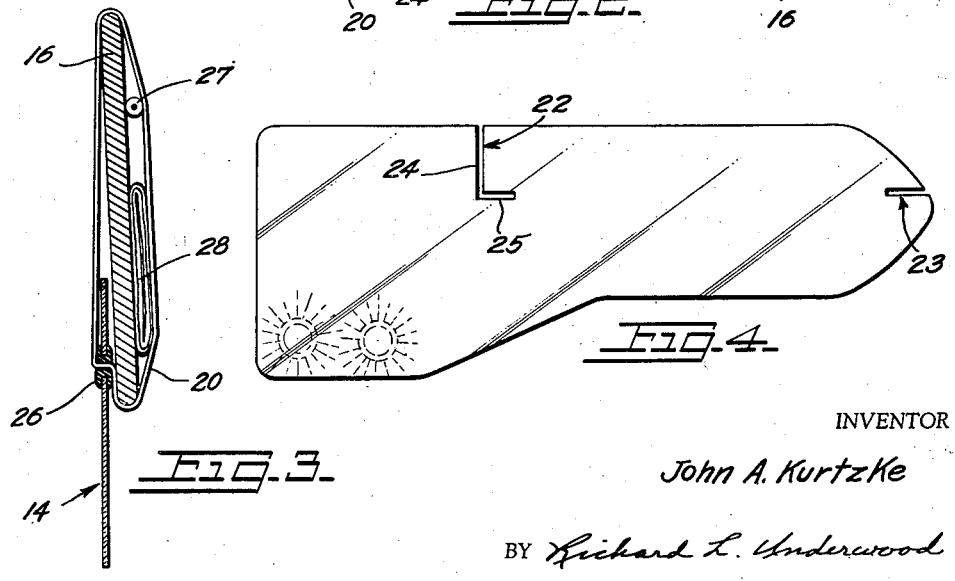
INVENTOR
John A. Kurtzke
BY Richard L. Underwood
ATTORNEY

2,833,591

AUXILIARY VISOR SECURABLE TO VEHICLE SUN VISOR BY RESILIENT MEMBERS

John A. Kurtzke, Laurelton, N. Y.

Application May 15, 1953, Serial No. 355,385

1 Claim. (Cl. 296—97)

My invention relates to an auxiliary automobile visor which may be easily mounted on the present standard automobile visor. The mounting means is designed to enable fine adjustment of the auxiliary visor to optimum positions suitable for various driving conditions.

Extensive research has shown that the standard clear windshield passes only 90% of the available light at night. State regulations usually require that the light transmission through windshields must not be less than 70%. In view of this, it is quite apparent that the use of tinted glass windshields to improve the safety of night driving has a very limited use in that the glare from high driving beam headlights will not be satisfactorily eliminated. The use of sunglasses is no answer to this problem since a lens sufficient to reduce the glare of driving beam headlights limits visibility for lower light intensities to a dangerous degree.

The many research projects undertaken to find a solution to this problem seem unified in the contention that a major step toward safe driving would be the selective and efficient elimination of glare from high intensity light sources, such as headlights. It will be appreciated that the selective elimination of headlight glare would also be applied to direct sun glare and other such similar sources encountered in highway driving.

My invention provides a device which may be used to selectively eliminate glare from intense light sources while not impairing the normal visibility of lesser and sometimes almost negligible light sources encountered in night driving. The driver is provided with an auxiliary visor which is easily mounted on the standard visor and, through my mounting system, is easily and swiftly adjustable into its most effective position. As is well known, the positioning of the steering wheel, seat, windshield, etc. varies with each automobile design, and it is necessary to provide a mounting means which will conform with these variations. Further, it will be appreciated that each driver requires a different positioning of a visor due to his height and driving posture. Also there are many high intensity light sources which must be reduced, such as severe snow glare, the sun, bright street lights, driving beam headlights, and the like. My invention enables the selective reduction of each of these glares through a simple and efficient mounting means.

My auxiliary visor is preferably manufactured from a flat sheet of amber-colored, transparent, and shatterproof material, ordinary manufacturing methods being suitable for its production. The visor has an upper portion which for purposes of description may be considered somewhat rectangular in shape and which provides a secondary glare shield for light sources of bright intensity emitted from a variety of sources. Integral with and depending from the outer bottom corner of the secondary glare shield is a primary eye shade which when properly positioned will selectively reduce the glare from oncoming driving beam headlights.

The ease of positioning the secondary glare shield, and especially the primary eye shade, is a result of my mounting design. A first slot is provided in the upper central part of the upper portion and a second slot is provided in the inner side section of my device. A pair of elastic members are laced through the slots, and are slipped around the standard automobile visor. These elastic members preferably converge toward each other to the top edge of the standard visor to facilitate the proper positioning of my device.

The elasticity of the auxiliary visor supporting or mounting means provides a readily accessible storage means for various driving accessories, such as maps, lists, pencils, etc. These may be placed on the shelf formed by the standard visor and held securely in place by the elastic auxiliary visor positioning means. In this respect the auxiliary visor supporting means cooperates with the standard visor to perform a dual function.

Various other objects and meritorious features of the invention will be apparent from the following description taken in conjunction with the drawings wherein like numerals refer to like parts throughout the several figures and wherein:

Fig. 1 is a view of my device mounted against the outer surface of the standard visor as a driver would see it in its position of use;

Fig. 2 is a view of my device mounted against the inner surface of the standard visor and in a stored position;

Fig. 3 is a side view taken on line 3—3 of Fig. 1 with various articles added; and Fig. 4 is a view of a modified form of my device.

As seen in Figs. 1-3 wherein my visor 14 comprises a flat member 15 mounted on the outer surface of the standard visor 16, it will be noted that the flat member 15 has an upper portion 17, part of which is in surface to surface contact with the outer surface of the standard visor. The upper portion 17 provides a secondary glare shield 18. Depending from and integral with the secondary glare shield is a primary eye shade 19 which has an outer square corner portion and an upwardly inclined inner edge portion. The inner edge of the secondary glare shield is preferably rounded as shown.

In Fig. 2 there is shown an auxiliary visor 14 which has been mounted on the inner surface of the standard visor 16 and is in position for return to the retracted position with the standard visor. On pivoting the standard visor upwardly to the ceiling of the automobile, the auxiliary visor will be hidden from view.

The mounting means for my auxiliary visor comprises a pair of elastic members 20 and 21 which are laced through a pair of slots 22 and 23, respectively, in the auxiliary visor 14. The first slot 22 in the upper central section is made up of a transverse opening 24 and a substantially longitudinal opening 25. The second slot 23, which is positioned in the inner curved end section, is substantially longitudinal.

The modification shown in Figs. 1-3 includes grommets 26 in the slots 22 and 23 which prevent injury to the elastic members by sharp edges of the auxiliary visor. These grommets also maintain the position of the visor with respect to the elastic members 20 and 21 through the frictional engagement therewith; no noticeable relative movement occurs even during the pivoting operation described below. It is preferred that the slots through which the elastic members are laced extend slightly upwardly and toward each other to provide a more firm engagement of the elastic members with the grommets and to cause a faster snapping action of the auxiliary visor when pivoting it from its retracted position against the standard visor (Fig. 2) to a usable position (Fig. 1).

As seen in Figs. 2 and 3, the mounting means for my device provides a holding means for various articles, such as the pencil 27 and the map 28.

Through my mounting design the auxiliary visor may be easily and quickly snapped into a preselected position of use by a simple and quick hand operation. Should the driver desire to change his driving posture to one side or the other, a simple sliding operation will position my device in the required new position. It will be noted that the outer side edge section of the secondary glare shield 18 may be slid outwardly when the complete height of the auxiliary visor is required. My mounting is designed to allow this adjustment. Further it will be appreciated that a similar arrangement may be provided on the passenger side of a car by merely reversing my auxiliary visor.

It will be seen that by virtue of the particular manner in which the elastic supporting members are laced through the slots in the auxiliary visor and the particular location of the slots in the body of the auxiliary visor, pivoting of the auxiliary visor into operative and inoperative position is a rapid and accurate operation. From the inoperative position illustrated in Figure 2 the auxiliary visor is snapped into operative position as illustrated in Figure 1 simply by grasping the upper portion of the auxiliary visor as illustrated in Figure 2 and pulling the same simultaneously rearwardly from and downwardly in relation to the standard visor. This produces a pivoting action of the auxiliary visor about its points of elastic support through the slots in the auxiliary visor.

During the pivoting movement the elastic support members yield to permit movement of the auxiliary visor away from the standard visor a sufficient distance to rotate the former about the slots as pivot points. After completion of the pivotal movement of the auxiliary visor, the elastic supports again tension and hold the auxiliary member, or at least a substantial portion of it, in firm face-to-face relationship with the standard visor.

In either position there is sufficient face-to-face contact between the two visors to maintain the two in firm relationship, prevent chattering, etc. This is by virtue of the fact that slots are spaced inwardly and remote from the respective horizontal marginal edges of the auxiliary visor.

By virtue of this particular mounting and support for the glare screen or auxiliary visor the same may be readily removed from the standard visor where desired and replaced with equal facility.

I claim:

An auxiliary visor for glare control adapted for adjustable and detachable mounting on a standard automobile visor comprising a generally rectangular member planar throughout its entire area and consisting of colored substantially transparent and shatter proof material, said member embodying a secondary glare shield portion at one end and a primary eye shade portion at the other, said eye shade portion being of greater transverse dimension than said glare shield portion, said member having a first slot within its body portion between said glare shield portion and said eye shade portion disposed angularly with reference to its longitudinal margins and a second slot adjacent the free end margin of said glare shield portion and disposed with reference to the longitudinal margins of said portion at a reverse angle to said first slot and at substantially the same inclination, each of said slots communicating with an outer margin of said member to permit reception of an endless elastic member from the exterior into the slot, said slots being adapted to receive wide elastic members laced therethrough and passing around said standard visor at an angle to the longitudinal margins thereof whereby the elastic members may yield to permit pivoting or sliding the auxiliary visor with reference to the standard visor about or along its points of elastic support into operative or inoperative position while retaining portions of said visors in firm face-to-face relation in either position, the location of said slots with reference to said eye shade portion permitting longitudinal adjustment of said auxiliary visor with reference to said standard visor to a position where the primary eye shade portion extends beyond the end and longitudinal margins of said standard visor.

References Cited in the file of this patent

UNITED STATES PATENTS

| 1,452,460 | Hart | Apr. 17, 1923 |
| 1,468,750 | Sechrist | Sept. 25, 1923 |
| 1,495,517 | Hogan | May 27, 1924 |
| 2,104,755 | Masino et al. | Jan. 11, 1938 |
| 2,194,697 | Fleming | Mar. 26, 1940 |
| 2,220,429 | Soderberg | Nov. 5, 1940 |
| 2,287,581 | Walker | June 23, 1942 |
| 2,477,680 | Young | Aug. 2, 1949 |
| 2,528,038 | Crise | Oct. 31, 1950 |
| 2,655,299 | Pfeiffer et al. | Oct. 13, 1953 |
| 2,701,612 | Steidl | Feb. 8, 1955 |
| 2,736,374 | Iverson | Feb. 28, 1956 |

FOREIGN PATENTS

| 680,758 | Great Britain | Oct. 8, 1952 |